May 27, 1952     P. S. DICKEY ET AL     2,598,236
CONTROL SYSTEM
Original Filed Jan. 30, 1946
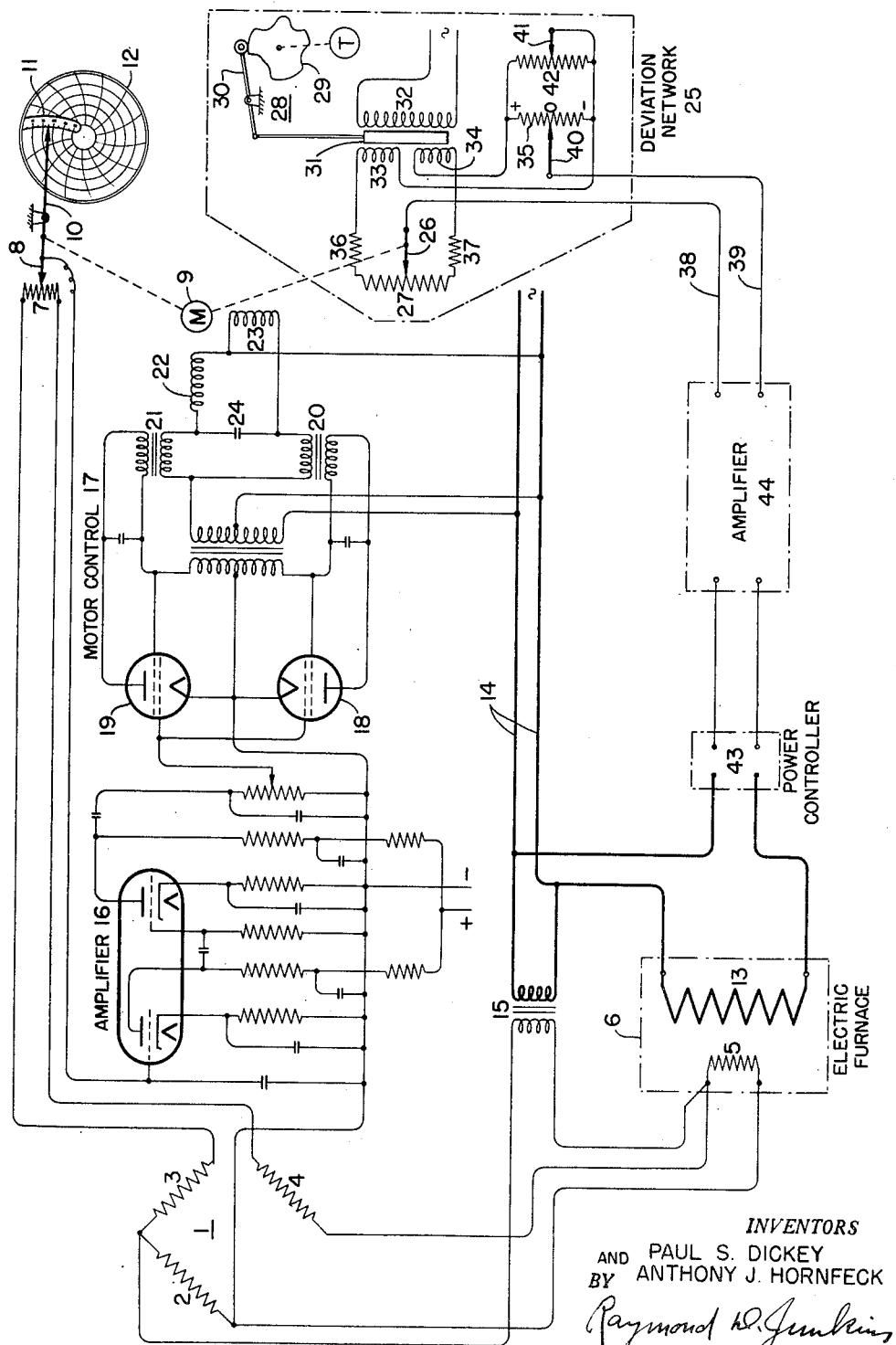
INVENTORS
AND PAUL S. DICKEY
BY ANTHONY J. HORNFECK
Raymond W. Jenkins
ATTORNEY Patented May 27, 1952

2,598,236

UNITED STATES PATENT OFFICE 2,598,236

CONTROL SYSTEM

Paul S. Dickey, East Cleveland, and Anthony J. Hornfeck, Lyndhurst, Ohio, assignors to Bailey Meter Company, a corporation of Delaware Original application January 30, 1946, Serial No. 644,267. Divided and this application January 18, 1949, Serial No. 71,424

5 Claims. (Cl. 236—46)

The present invention relates to measuring and/or control systems, particularly of the electronic circuit type. A variable condition, quantity, quality, position or other variable which may be represented by an electrical resistance value may be continuously and instantaneously compared to a desired value and the deviation measured or used in control. The measurement so obtained may be used to effect a control of the same or another variable which may or may not contribute to the magnitude or change in magnitude of the variable being measured.

Specifically our present invention provides improvements in an electronic measuring and controlling circuit allowing a control standard value to be established in accordance with a predetermined time program. Thereafter the deviation of the actual value of the variable from the desired or programmed value is determined and indicated and may be used in the control.

A further object of our present invention is a continuous subtraction of values which in effect is the same as the deviation between one variable and a predetermined standard.

Still another object is the incorporation in such a measuring and controlling system of a telemetric circuit through whose agency the measuring and controlling circuit may be located at a considerable distance from the point of control or from the point of actual variation in the variable being measured or under control.

We have chosen to illustrate and describe our invention in connection with certain basic electronic measuring circuits as representative only and not limited thereto. In general, we describe our invention in connection with a phase sensitive A.-C. bridge network including a resistance thermometer. We illustrate and describe a telemetric circuit of the movable core transformer type and incorporate the measuring control in connection with an electric furnace.

In the drawing the single figure is a schematic showing of a measuring and control circuit in accordance with our invention applied to an electric furnace.

Referring now to the drawing, we indicate at 1 a phase sensitive A.-C. bridge having fixed resistor arms 2, 3 and 4. The fourth arm of the bridge 1 is a resistance element 5 located in an electric furnace 6 and sensitive to the temperature thereof. For balancing the network we provide an adjustable resistance 7 having a movable contact arm 8 for proportioning the resistance 7 between the arms 3 and 4.

For positioning the contact arm 8 we provide a motor 9 which also positions an indicator 10 relative to a scale 11 and a revoluble chart 12, thereby providing an instantaneous indication as well as a continuous record of the value of temperature to which the resistance arm 5 is sensitive.

The furnace 6 is preferably heated by electric resistance element 13 receiving current from an A.-C. source 14, which also provides A.-C. supply to the bridge 1 through a transformer 15.

Preferably the bridge arm 5 is a platinum resistance measuring element. The conjugate corners of the bridge 1 are connected to an amplifier 16 and motor control 17 for the motor 9. For an understanding of a phase sensitive A.-C. bridge for measuring the resistance of the leg 5 subjected to temperature of the furnace 6 reference may be had to the Ryder Patents 2,275,317 and 2,333,393. The conjugate voltage supplied to the amplifier 16 assumes a balance or unbalance and a phase relation relative to the supply voltage dependent upon the magnitude and sense of the unbalanced condition of the bridge 1. The amplifier 16 selectively controls a pair of motor tubes 18 and 19. The tubes 18, 19 control the amount and direction of unbalance of saturable core reactors 20, 21 for directional and speed control of the capacitor-run motor 9 adapted to position the arms 8, 10.

The motor 9 is of an A.-C. type having windings 22 and 23 ninety electrical degrees apart and also having a capacitor 24. When alternating current flows directly through one of the windings and simultaneously through the other winding in series with the capacitor, the motor rotates in predetermined direction and at a speed determined by the extent of unbalance of the saturable core reactors 20, 21. It is not necessary to go into greater detail as to the construction and operation of the amplifier 16 and motor control circuit 17, as reference may be had to the above mentioned Ryder patents.

So far we have described a known circuit arrangement for continuously measuring the temperature of the furnace 6 and providing a visual indication thereof upon the index 11 and a continuous record upon the chart 12. The balanceable network provides a continuous measurement without intermittent feeling devices, galvanometers, or other moving parts except for the power motor 9, which is selected to provide ample power to position the indicating-recording arm 10 and the balancing contact 8. Preferably and usually the elements 1, 16, 17, 9 are located in the casing containing the indicator and recorder and may be mounted on a panel board or at any desired central control location. Such a location may be adjacent to or remote from the furnace 6.

In our present invention additionally we provide a deviation network 25 for continuously comparing the actual value of the temperature or other variable with a desired or standard value. The network 25 continuously determines the deviation, if any, between the actual and the desired value of the variable or variables and utilizes such information in continuously visually advising the extent of deviation or as a basis for the control of the same or another variable which may or may not contribute to the change or maintenance of the original variable being measured.

Specifically, the network 1, 16, 17 is sensitive to the temperature of the furnace 6 at the resistance arm 5 for continuously determining such temperature and indicating it upon the index 11 and recording it upon the chart 12. Simultaneously the motor 9 controls the position of a contact arm 26 along a slidewire potentiometer 27 of the deviation network 25. The deviation network preferably is located in the casing with the recorder and is mechanically close to the motor 9.

In this preferred embodiment, we desirably continuously compare the actual temperature at the element 5 with a desired or standard temperature to be maintained within the furnace 6 and illustrate the deviation network 25 as containing a time cycle or program mechanism 28 establishing the desired or standard temperature which may be uniform over the 24 hour period or may be programmed to have a different temperature at different times of the day.

The program mechanism 28 includes a time motor T driving a program cam 29. A fulcrumed roller arm 30 is continuously positioned by the program cam 29 and in turn positions a magnetic core piece 31 relative to windings 32, 33, 34. The elements 31, 32, 33 and 34 constitute a movable core transformer wherein the primary winding 32 is continuously energized across an A.-C. source. The position of the core piece 31 in relation to the windings determines the inductive relation between the primary 32 and the secondaries 33, 34, and thereby the potential relation between the windings 33, 34.

Interposed between the windings 33 and 34 is a potentiometer or resistance 35. The elements 27, 33, 35 and 34 are connected in series loop with calibrating resistances 36, 37. As mentioned, the loop circuit receives energization inductively from the primary 32 through the coupling provided by the magnetic core piece 31. Across the loop are conductors 38 and 39 connected respectively to contact arms 26 and 40. The arrangement is such that the conductors 38, 39 divide the loop into two portions which may or may not be balanced insofar as sense and magnitude of potential are concerned. If the two portions of the loop are in balance, then the conjugate conductors 38, 39 are electrically null as to magnitude or sign of potential. If an unbalance occurs between the two portions of the loop, then a potential exists between the conductors 38, 39 of a sense and magnitude determined by the direction and extent of unbalance.

Assume first that the loop is in balance. No potential exists between the conjugate conductors 38, 39. If the contact arm 26 is moved in one direction along the resistance 27, the loop becomes unbalanced and a potential is set up between the conjugate conductors 38, 39 of a sense depending upon the direction in which the contact 26 had been moved.

Assume again that the loop is in balance. If the core piece 31 is moved in one direction, relative to the windings 32, 33 and 34, then the inductive balance between the windings is disturbed, and either the winding 33 or the winding 34 is to a greater extent under the control of the core piece 31, and thus receives a greater inductive effect from the primary 32. A potential is established between the conjugate conductors 38, 39 whose sense is determined by the direction of movement of the core piece 31 and whose magnitude is determined by its extent of movement.

This analysis is, of course, on the assumption that the contact arm 40 is not moved from its previous position along the resistance 35, and that a contact arm 41 is not moved from its position along a resistance 42.

In general, the potential condition in the conjugate conductors 38, 39 is representative of the direction and extent of deviation of the actual temperature at the element 5 as compared to the desired temperature as represented by the position of the core piece 31 relative to the windings 32, 33 and 34.

Such manifestation of coincidence or of deviation may be utilized in a control of the furnace 6 to eliminate deviation and to maintain the temperature at the element 5 in correspondence with the desired standard which may be a uniform standard or a programmed standard. Obviously the cam 29 may be shaped to dictate a desired program varying with time. If the cam 29 is circular then the core piece 31 retains its uniform coupling of the windings 32, 33 and 34 establishing a uniform temperature standard for comparison with the actual temperature.

We have indicated that the contact arm 40 is manually movable along the resistance 35 from a zero position in one direction plus and in the other direction minus. Such indications are of deviation between the actual and a desired value of temperature. The predetermined shape of the program cam 29 may be useful under different conditions which would indicate that a constant deviation of a few degrees in one direction or the other is desirable for a particular condition of operation. For example, if the furnace 6 is used to heat treat metal objects, then the general program (as arranged on the cam 29) of bringing the furnace 6 up to temperature and maintaining it at one or more preselected temperatures over given periods of time might hold true for the particular metal being treated. However, if one batch of castings are large compared to another batch of smaller castings, then while the program may hold constant for the two batches, still one might desirably be at a temperature of 10° above the other throughout the program. Such a control condition may be established by manually moving the contact arm 40 along the resistance 35 in either a plus or a minus direction depending upon whether the actual temperature is to deviate a constant amount above or a constant amount below the standard established by the position of the core 31 relative to the windings 32, 33, 34.

Graduations adjacent the resistance 35 may be in degrees temperature or in percentage or otherwise. There is a uniform proportionality between the motion of the slidewire contact 26 and motion of the transformer core 31. With this linear or straight line relation the deviation determined by the setting of the pointer 40 along the resistance 35 is a predictable and uniform measure of deviation. With an adequate control system functioning sensitive to the potential condition of the conjugate conductors 38, 39 the relation of the elements 40, 35 predetermines a constant deviation or difference between the actual temperature and the desired temperature irrespective as to whether the desired temperature is a uniform or constant temperature or is one varying with time in predetermined manner.

In the embodiment being described we provide an electrical control of the heat input of the resistor 13 to the electric furnace 6. We have shown in this connection a power controller 43 which forms no part of the present invention. This may be a General Electric Reactrol described in Patents 2,266,569, 2,285,172, 2,285,173 and 2,383,806, or any other adaptable power controller for the resistor 13. Our invention applies to the power controller 43, the establishment of an electrical value, through an amplifier 44 if necessary, responsive or sensitive to the potential condition of the conjugate conductors 38, 39 and thereby sensitive to the deviation network 25 continuously comparing the actual temperature at the element 5 with a predetermined or desired temperature. The output of the power controller 43 (input to the furnace 6) is in proportion to deviation or unbalance condition existing across 38, 39.

A distinction of this electrical circuit is that while the deviation network 25 is a balanceable network it is not balanced by means of movement of the contact 40 over the potentiometer 35 (following an unbalance caused by movement of 26 or 31) but becomes balanced again only when a correction has been applied to the heating of the furnace 6 with a corresponding correction of the temperature to which the resistance element 5 is sensitive.

Assuming the loop circuit of the deviation network to be in balance and the magnetic core piece 31 fixed in position, a variation in temperature in the furnace 6, effective upon the resistance arm 5, results in a positioning of the contact arm 26 along the potentiometer 27 to a position representative of the new temperature. This produces an unbalance in the loop with a resulting potential across the conjugate conductors 38, 39 whose direction and magnitude is related to the direction and magnitude of movement of the arm 26 from the balanced position. The potential condition of the conductors 38, 39 is effective upon the power controller 43 for increasing or decreasing the electrical energy through the heater 13 to restore the temperature at the element 5 to predetermined desired value. The loop of the deviation network 25 is, therefore, not returned to a balanced condition until the temperature at the element 5 returns to the desired standard value with consequent return of the arm 26 to its previous position along the resistor 27.

It will be apparent that the deviation loop may be thrown out of balance by a movement either of the arm 26 or of the core 31 and that either of such movements will result in an adjustment of the heater 13 for change in temperature to which the element 5 is sensitive. For example, if the system is in balance and the desired temperature exists at the element 5, then the time program cam 29 may call for a new temperature through a movement of the core 31. This unbalances the deviation loop, resulting in an adjustment of the heater 13 and a change in temperature to which the element 5 is sensitive.

If the heater 13 brings such temperature to the newly desired value, the loop is again balanced but at a new position of the arm 26 and of the core 31.

In such a system as we have described there will exist a thermal lag from the time a change in electric energy is made through the resistor 13 and consequent change in temperature to which the element 5 is sensitive. Thus there will exist a lag between the time of movement of the core 31 and of the attainment of a new position of the arm 26 sufficient to balance the deviation loop.

If the program cam 29 is cut to a spiral or uniform rise characteristic, then a uniform time lag will exist between the temperature called for by the position of the plunger 31 and the temperature actually existing as indicated by the position of the arm 26. The steeper the rise of the cam 29 the greater will be the deviation between the two representations of temperature. That is, if the cam rise is very steep there will be a greater span in temperature between the temperature desired as indicated by position of the core 31 and the actual temperature as indicated by the position of the contact arm 26. This in simple language because the heating effect of the furnace can not keep up with the demand for change in temperature.

Either the thermal lag of the heating system or the time lag between the movement of the plunger 31 and movement of the contact 26 will produce the deviation between the desired temperature and the actual temperature. Such a deviation can be ascertained for any given installation or condition of operation and can be compensated for by movement of the contact 40 along the resistance 35. In other words, if it is ascertained on a given furnace installation that during normal operation there is a thermal lag of so many degrees in changing temperature, a certain amount of compensation can be taken care of through the elements 40, 35. The same is true in regard to a follow-lag on a gradually changing temperature program of the cam 29. It is appreciated that a gradual change in temperature in one direction followed by a gradual change in the other direction may mean a plus deviation for one period of time, followed by a minus deviation. This could not be compensated for by a single adjustment of the arm 40 relative to the resistance 35. However, such conditions are usually not of the same extent or duration and the one of major consequence may be compensated for while the other condition may be neglected.

It is possible to incorporate in the shape of the cam 26 corrections for both positive and negative deviations after the characteristics of the system have been explored and studied. Thus the shape of the cam 29 may readily be changed to incorporate changes in desired program, as well as to incorporate corrections for deviation between the actual and the desired temperature, which deviation may result from thermal lag of the heating system or from mechanical and/or electrical follow lags.

This application constitutes a division of our copending application Serial No. 644,267 filed January 30, 1946, now Patent 2,491,606 dated December 20, 1949.

What we claim as new, and desire to secure by Letters Patent of the United States, is:

1. Temperature control means for a furnace or the like comprising in combination, a furnace, heating means for said furnace, a controller for said means, a resistance thermometer subject to the temperature of the furnace and including a motor actuated to indicate the temperature, a deviation bridge including a pair of resistors each having a movable contact element, a conjugate conductor connecting said movable contacts for possible division of the bridge into two equal sections, means to induce alternating current into each section to energize the same comprising a dual secondary transformer having one secondary connected in each section, a primary and a movable core element to inversely control the coupling of the secondaries to the primary, means connecting said motor to actuate one of said movable elements, program means to move another of said movable elements to establish desired temperature standards changeable with time, means responsive to unbalance current in said conjugate conductor for actuating said heating means controller, and the remaining movable element being manually adjustable to determine the degree of deviation of the furnace temperature from the programmed temperature and independent of any change in position of the controller for the heating means.

2. The combination of claim 1 in which the last mentioned movable element is a contact movable over one of said resistors, a shunt for said resistors and manual means to adjust the value of said shunt.

3. The combination of claim 1 wherein the movable element which is positioned by the program means is the movable core of said transformer.

4. Control means for regulating a variable condition of a furnace or the like comprising in combination, a furnace, regulating means of the variable condition in the operation of the furnace, a measuring system for the variable and including a motor actuated to indicate the value of the variable condition, a deviation bridge including a pair of resistors each having a movable contact, a conjugate conductor connecting said movable contacts for possible division of the bridge into two equal portions, means to induce alternating current to each portion to energize the same comprising a dual secondary movable core transformer having one secondary connected in each portion and having a primary and a movable core to inversely control the coupling of the secondaries to the primary, means connecting said motor to position one of said movable contacts, program means to position the movable core to establish desired standards of value of the variable conditions with time, means responsive to unbalance current in said conjugate conductor for actuating said regulating means, and the remaining movable contact being manually adjustable to determine the degree of deviation of the variable condition from the programmed value and independent of any change in position of the regulating means for the variable condition.

5. Control means for regulating a variable condition of a furnace or the like comprising in combination, a furnace or the like having a condition variable with and during operation thereof, regulating means of the variable condition, means continuously responsive to the value of the said variable condition, an electrical deviation bridge including a pair of resistors each provided with a movable contact, a conjugate conductor connecting said movable contacts for possible division of the bridge into two equal portions, means to induce alternating current into each portion to energize the same comprising a dual secondary movable core transformer having one secondary connected in each portion and having a primary and a movable core to inversely control the coupling of the secondaries to the primary, means connecting the value responsive means to position one of said movable contacts, program means to position the movable core to establish desired standards of value of the variable condition with time, means responsive to unbalance current in said conjugate conductor for actuating said regulating means, and the remaining movable contact being manually adjustable to determine the degree of deviation of the variable condition from the programmed value and independent of any change in position of the regulating means for the variable condition.

PAUL S. DICKEY.
ANTHONY J. HORNFECK.

REFERENCES CITED

The following references are of record in the file of this patent:

UNITED STATES PATENTS

| Number | Name | Date |
|---|---|---|
| 1,795,753 | Boon | Mar. 10, 1931 |
| 2,025,542 | Lugar | Dec. 24, 1935 |
| 2,220,028 | Smith | Oct. 29, 1940 |
| 2,406,221 | Hornfeck | Aug. 20, 1946 |
| 2,412,263 | Hartig | Dec. 10, 1946 |
| 2,491,606 | Dickey et al. | Dec. 20, 1949 |